(12) United States Patent
Kluge et al.

(10) Patent No.: US 6,975,909 B2
(45) Date of Patent: Dec. 13, 2005

(54) ELECTRONIC PRODUCT/SERVICE MANUAL

(75) Inventors: Eva Kluge, Munich (DE); Marc Hoffman, Neubiberg (DE); Werner Posch, Oberhaching (DE)

(73) Assignee: Critical Reach, AG, (DE)

( * ) Notice: Subject to any disclaimer, the term of this patent is extended or adjusted under 35 U.S.C. 154(b) by 662 days.

(21) Appl. No.: 10/002,614

(22) Filed: Nov. 29, 2001

(65) Prior Publication Data

US 2003/0100964 A1 May 29, 2003

(51) Int. Cl.[7] .............................................. G05B 15/00
(52) U.S. Cl. ........................ 700/83; 707/100; 707/101; 707/102; 707/103 R; 707/103 Y; 707/103; 707/103 Z; 707/104.1; 700/88
(58) Field of Search .............................. 700/83; 701/3; 345/184; 707/2, 101, 102, 103 R, 103 Y, 707/103, 104.1, 100

(56) References Cited

U.S. PATENT DOCUMENTS

| | | | |
|---|---|---|---|
| 5,504,674 A * | 4/1996 | Chen et al. ..................... 705/4 |
| 5,794,257 A * | 8/1998 | Liu et al. .................. 715/501.1 |
| 5,864,480 A * | 1/1999 | Ladd ............................. 700/83 |
| 6,438,535 B1 * | 8/2002 | Benjamin et al. ............... 707/2 |
| 6,453,687 B2 * | 9/2002 | Sharood et al. ............... 62/127 |
| 6,559,882 B1 * | 5/2003 | Kerchner ...................... 348/61 |
| 6,567,079 B1 * | 5/2003 | Smailagic et al. .......... 345/184 |
| 6,606,544 B2 * | 8/2003 | Glenn et al. .................... 701/3 |

\* cited by examiner

*Primary Examiner*—Anthony Knight
*Assistant Examiner*—Thomas Pham
(74) *Attorney, Agent, or Firm*—Baker & Hostetler LLP; Burman Y. Mathis

(57) ABSTRACT

An electronic product manual including a plurality of data structures having a hierarchical relationship as components and sub-components with each other. A graphical user interface (GUI) is configured to present the plurality of data structures to a user as displayed objects, receive input from the user, and enable a user to select a displayed object. A first view of the data structure is displayed in the GUI upon selection of the object, the first view comprising an image. A second view of the data structure displayed in the GUI upon selection of the object, the second view including information indicating the hierarchical relationship of the selected object with respect to other objects. A third view of the data structure displayed in the GUI upon selection of the object, the third view including object-specific information.

24 Claims, 6 Drawing Sheets

Related Documents:

Porthole model
Angled control panel
Advanced Novotronic controls
Single knob operation
Hydromatic wash system
Scoop and ladle fin system
Extended wash programs
Top wash temperature of 190°F
Quick Wash 105°F program
Short wash program
Program sequence lights
Automatic water levels
Water Plus option
Gentle Wash option
Prewash option
Top spin speed of 1200 RPM
Low water consumption
Fault indicators
Self diagnostics
Cast iron cradle
Hydraulic suspension
Available in white only
Available in right hinge only
Utilizes WTV319A stacking kit

Functionality:

Extended wash programs
Quick Wash 105°F program
Short wash program
Program sequence lights
Gentle Wash option
Prewash option
Spin
Rinse
Fill
Fault indicators
Self diagnostics

Actions:

Operate porthole door
Single knob operation
Set spin speed of 1200 RPM
Set water consumption
Interpret Fault indicators
Interpret Self diagnostics
Remove top access panel
Access lint filter

203

Error conditions:

No power
No response to control settings
Fault indicators
Door will not open
Clothes are not clean

CONTROL PANEL — 204

Lint Filter Access Panel

201

Washing machine
  Control panel
    Control knob
  Digital Display
  Porthole
    Window
  Top access panel
  Housing Body
    Lint Filter Access Panel

```
<de.janet.app.unit.Unit ID="Engine">
    <name>Engine</name>
    <orderInfo>
        <de.janet.app.unit.OrderInfo>
            <orderId>0001000</orderId>
            <quantity>1</quantity>
        </de.janet.app.unit.OrderInfo>
    </orderInfo>
    <renderInfo>
        <janet.topas.components.TCRenderInfo>
            <viewpointPosition value="translation = (5.4827591378103016, 2.3270326577646596, 2.1217998786636603), rotation = (-.4635803440736771, 0.8584582069714881, 0.2194147396523266, 0.8995972191091)"/>
        </janet.topas.components.TCRenderInfo>
    </renderInfo>
    <technicalData>
        <de.janet.app.unit.TechnicalData>
            <content><![CDATA[The engine gives a car the power to go]]></content>
        </de.janet.app.unit.TechnicalData>
    </technicalData>
    <subunits>
        <!--INCLUDE cylinderhead/cylinderhead.tml-->
        <!--INCLUDE engineblock/engineblock.tml-->
        <!--INCLUDE distributingbox/distributingbox.tml-->
        <!--INCLUDE oelfilter/oelfilter.tml-->
        <!--INCLUDE generator/generator.tml-->
        <!--INCLUDE clutch/clutch.tml-->
        <!--INCLUDE gearbox/gearbox.tml-->
    </subunits>
</de.janet.app.unit.Unit>
```

FIG. 6

ELECTRONIC PRODUCT/SERVICE MANUAL

BACKGROUND OF THE INVENTION

1. Field of the Invention

The present invention relates, in general, to computer aided methods of presenting information, and, more particularly, to software, systems and methods for providing three-dimensional and two-dimensional graphic, interactive product and service manuals.

2. Relevant Background

Efficient distribution of goods and services often depends on related documentation such as instructions, product manuals and service manuals. As products become more complex, it is useful for consumers to have ready access to information about the products to aide in installation, setup, configuration, troubleshooting and repair. In an industrial setting, machines are often specifically designed for special purpose and involve complex components and subsystems that must be continually maintained and repaired by machine operators. Operators, however, are often not trained specifically for machine maintenance tasks and must refer to product documentation. Moreover, consumer products such as appliances, automobiles and household machinery are increasingly complex thereby making reference to documentation more frequent and important to the consumer.

Service professionals that offer setup and repair services for both industrial and consumer products depend on the availability of effective, up-to-date documentation. To be effective, the documentation must be easy to use and available as well as aid the service professional's ability to perceive, diagnose, and correct problems. Up-to-date documentation means that the documentation must cover not only the current version of a product, but also non-current versions that may require service for decades.

The art and science of documentation involves communicating information, often very specific and focused information, about complex products and systems. Complex products and machines are typically made from arrangements of simpler piece-parts, components and systems. The components themselves may comprise sub-components and subsystems. In the final product, these assembled sub-components define spatial relationship to each other that dictate how the product looks as well as a functional relationship with each other. Each component has a set of information associated only with that component (e.g., repair instructions, ordering information, and the like) as well as information about its relationship with other components (e.g., part A is engaged to part B using a $5/16''$ bolt and locknut).

Existing documentation systems are inadequate to allow a user to efficiently interact with visual information and relationship information to isolate the specific and focused information needed at a particular instant from the mass of documentation provided for an entire product. Traditionally, product information has been distributed in paper form by way of brochures, manuals, instruction booklets and the like. Paper is a limited media in which to present information relating to products and systems because it only presents two dimensions and is only presented linearly. This forces a user to become very familiar with the paper product to be able to index through it quickly, or to frequently reference an index or table of contents to find desired information.

More recently, this type of information is provided in electronic form including hyperlinked documents that allow a user to select objects on one page and automatically jump to another page. Hyperlinked interfaces enable a user to interact with a document and more readily reach information that is of immediate interest rather than following an pre-scribed order through a document. However, these prior systems persist in presenting information in a flat or linear manner that mimics paper-based media. While hyperlinked documents allow a user to pursue a non-linear flow, there has not been, to date, an effective equivalent with graphical information.

Importantly, these systems require the manual to be specifically compiled in the new media format, and do not easily leverage existing material from marketing materials, CAD files, product literature, or other sources that have been previously compiled. For example, a manual can be provided in electronic form using most word processing, presentation, spreadsheet, and similar application software that enables images and/or media files to be embedded in a document. In the case of hyperlinked documents, the document may comprise a plurality of links to other documents or pages of information stored in a database associated with the presentation logic.

In either case, the embedded files or database either contain information specially created for the manual, or copies of pre-existing files that have been reformatted or "re-purposed". Hence, the database is closely coupled to the presentation logic (e.g., a web server) of the manual rather than being coupled to the business processes that produce the product, provide the service, or generate the documentation. As a result, the database copies tend to become out of date with respect to the most current product information. A need exists for systems and methods for integrating existing databases with a product manual user interface so that the product manual presents the most relevant information to a user.

Three-dimensional rendering and imaging is an effective technique for conveying information for many products and services. Three-dimensional images assist users and service technicians in identifying components and manipulating/operating machinery and tools in a way that plane views do not. Accordingly, many product and service manuals include three-dimensional illustrations. However, existing three-dimensional illustrations fail to allow user interaction by selection and manipulation of three-dimensional objects. Essentially, the images provide a fixed vantage point, fixed function informational display that does not enable user to interface with the manual through the three-dimensional image. Hence, a need exists for a product and service manual having a three-dimensional graphical user interface.

One of the reasons three-dimensional user interfaces have not be widely deployed is that users can actually become disoriented when viewing and navigating about complex systems viewed in three dimensions. Changing zoom and perspective can readily disorient the user forcing them to back out to a familiar perspective and restart their navigation process. Accordingly, there is a need for a three-dimensional product and service manual that enables easier, intuitive navigation of complex systems.

One important type of interaction that is needed in conjunction with service and product manuals relates to interactive messaging and parts ordering. Whether being used by an end-user or service technician, once a particular component of a system is identified more information about that component may be desired. For example, local sources for a part and/or inventories of a part may be desired. In some cases, a part may need to be ordered and/or delivered to replace a worn or defective part. In other instances, the manual user simply needs more information such as material composition, specifications, or up-to-date troubleshooting information. Conventional non-interactive manuals in either paper or electronic form may provide customer service telephone numbers, or web site addresses and even links to web sites that provide further information, but lack sophisticated inventory, ordering, and messaging interfaces that enable interaction between a user and an external support service such as a parts supplier or manufacturing customer service representative.

Conventional static manuals vary significantly in the amount of information that is contained therein, trying to balance the need for comprehensive information against the need to make the manual compact and easy to use. This balance is required because in any given situation, a manual provides much more information that is needed to solve a problem at hand. A need exists for methods and systems for delivering product manual information as needed and requested by a user.

SUMMARY OF THE INVENTION

Briefly stated, the present invention involves an electronic product manual including a plurality of elements having a hierarchical relationship as components and sub-components with each other. A data structure stores data of various types representing the components and sub-components. A graphical user interface (GUI) is configured to present selected portions of the data structure to a user, receive input from the user, and enable a user to select an object from the display. A first view of the data structure displayed in the GUI upon selection of the object, the first view comprising an image of the object. A second view of the data structure is displayed in the GUI upon selection of the object, the second view including information indicating the hierarchical relationship of the selected object with respect to other objects. A third view of the data structure displayed in the GUI upon selection of the object, the third view including object-specific information.

BRIEF DESCRIPTION OF THE DRAWINGS

FIG. 2 illustrates a first representation of a user interface of an electronic manual in accordance with the present invention;

FIG. 6 is an exemplary markup language document used to implement a particular instance of a unit data structure in accordance with the present invention.

DETAILED DESCRIPTION OF THE PREFERRED EMBODIMENTS

Figure 1:
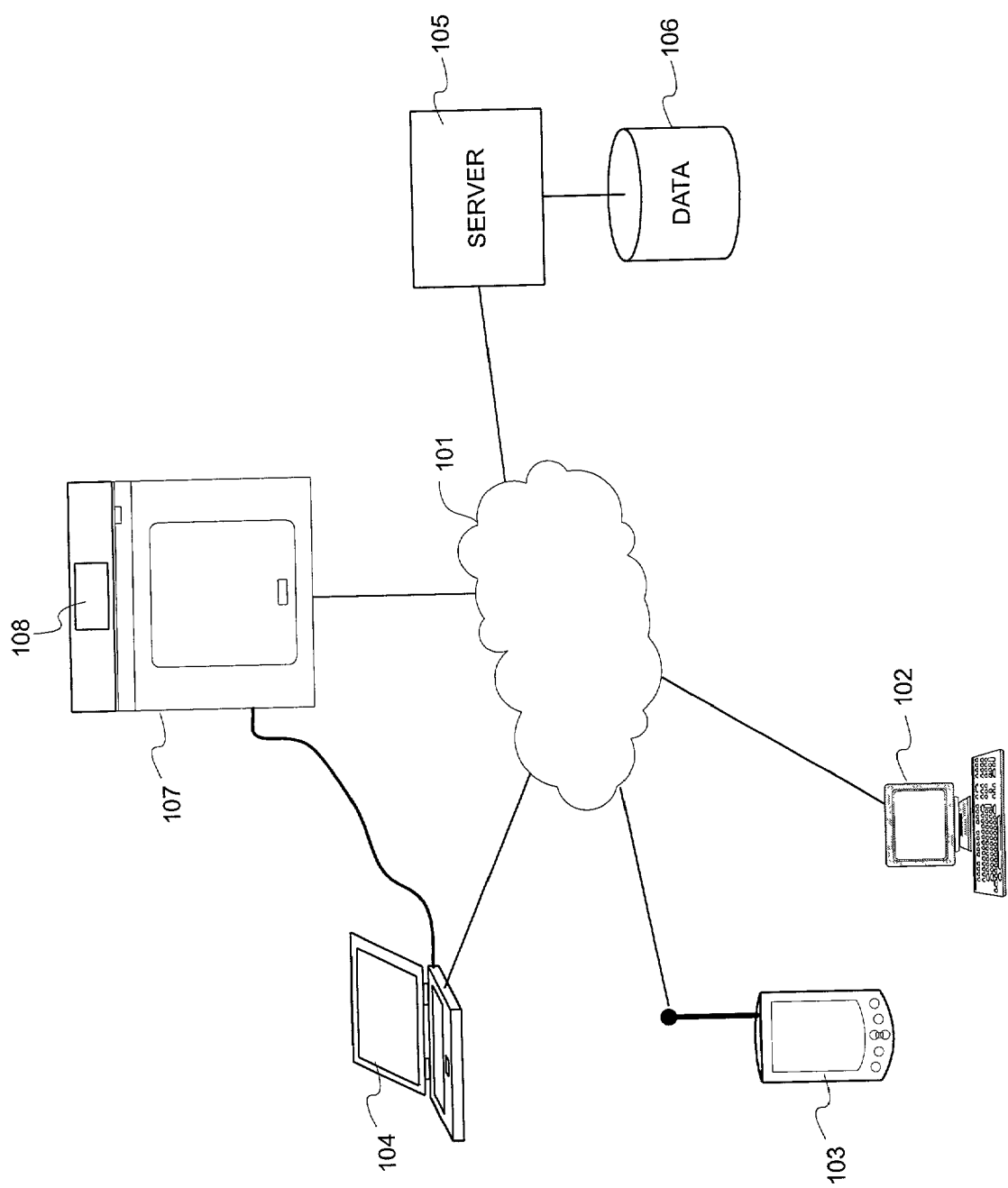
FIG. 1 shows an computer environment in which the present invention is implemented.

An important feature of the present invention is the incorporation of a truly interactive graphical user interface (GUI). The present invention involves creating a single comprehensive representation of a product or service called a "unit data model". The unit data model includes various types of data about the product or service where each type of data included may only be relevant in limited set of contexts. For example, the unit data model may include graphical representations of a product, ordering and shipping data, repair data, operation data, troubleshooting data and the like in a single data structure. In a preferred implementation, the unit data model is implemented as a data structure without any associated behavior or program elements. In a less preferred alternative implementation, the unit data model is embodied in an object-oriented structure called a unit data object that includes not only the unit data model itself, but generic methods that expose the unit data model data for access by external applications.

The present invention also involves a graphical user interface (GUI) application configured to access the unit object. The GUI application is preferably configured for a particular context related to the role of the user operating the GUI application. This configuration may be static or dynamic (e.g., the application implemented on a loading dock can be statically defined to that role whereas a browser application may be dynamically configured for various roles depending on the user identification. Because the GUI application can access any of the various types of data from the unit data structure, the unit data structure is readily shared across the various GUI application instances, and is accessible by the various methods of displaying data that are implemented within any GUI application.

The rich and varied nature of the data contained in the unit data structure allows the combination of interactive two-dimensional and three-dimensional graphics with interactive text describing the graphics and interactive product structure information such as hierarchical views. Preferably, a GUI application displays disparate views of the relevant unit data model simultaneously such that, for example, a graphical view is displayed along side a text description and/or hierarchical display of the product represented by the unit data model. Preferably, each of the displayed views is interactive such that a user may selected a particular portion or element that is displayed and cause the GUI application to implement a programmed behavior. The programmed behavior may, in many instances, update one or more of the displayed views to show more or less detail or a new perspective of the product associated with or represented by the unit data structure.

A particular implementation of the present invention involves use of three-dimensional graphics to display portions of the unit data model. One aspect of the present invention uses an efficient and expedient method for embedding component identification information into the frame buffer of the display device itself so that it is readily manipulated using operating system methods that are already available in most commercial operating system software. This method is described in co-pending U.S. patent application Ser. No. 10/001,940 assigned to the assignee of the present invention and entitled "SYSTEM AND METHOD FOR IMPLEMENTING A THREE-DIMENSIONAL GRAPHIC USER INTERFACE" and incorporated herein by reference.

As noted above, a key limitation of online manuals is their failure to show information that is relevant to a user at runtime. By the terms "user-relevant information" and "user-centric information", it is meant that the perspective and content of three-dimensional data matches the perspective and content desired by a user. This may also be referred to as "context-sensitive" display as the content that is displayed and the manner in which the content is displayed may vary depending on the user's current context. While various techniques have been used to display these different types of data in the past, these prior approaches involved multiple separate and independent data structures such that each data structure held data that was relevant to a particular user, role or context. In contrast, the present invention enables a single data structure, the unit data structure or unit object, that can be shared across these disparate users, roles and contexts.

In the case of non-graphical data, user-relevant data means that the data is current and applicable to the real-world system corresponding to the manual. The vast quantity of potential information forces conventional systems to truncate the available information both in content and in the presentation logic used to present the data. This, in turn, limits the ability of the manual to present relevant views, relevant perspectives in those views, relevant animation, relevant troubleshooting information. As a result, product and service manuals are generally if not exclusively machine centric or product centric in that they provide information having content and perspective selected by the system, not the user. The unit data structure in accordance with the present invention enables incorporation of data from external databases and so can access and present data at runtime, allowing a virtually unlimited amount of data that can be formatted and presented to satisfy the current demands of a user.

By way of a particular example, the external interfaces may include a link to dynamic external sources such as interfaces for ordering components and parts. The most advance systems available to date may include a phone number or online order tool for an entire system. For example, an appliance manufacturer may include a web link that would allow a user to order a new timing belt or bolt from the appliance manufacturer. In contrast, some embodiments of the present invention enables an application to implement an order interface on an object-by-object basis. Hence, an entry in the data structure representing a drive belt for a washing machine include information providing a link to the washing machine manufacturer, or a link to a local appliance dealer, hardware store, or belt manufacturer. In this manner, the order interface can be relevant to the user's immediate needs. A preferred implementation enables a user to submit the order directly in the manual and transfer the order using server side processes directly in the vendors backend system (e.g SAP R/3) to process the order. Some advantages of this implementation include unambiguous spare part identification and ordering. Alternatively the order can added to a shopping cart, that is maintained in a e-commerce system. Some systems (e.g., Commerce One, Websphere Commerce Suite) have standard interfaces ("roundtrip", "punch out") that can be accessed by a external applications such as the present invention to identify spare parts. In this manner, the preferred implementations enable efficient and accurate parts ordering directly from the manual application in accordance with the present invention.

Another example of the presentation of user-relevant information involves the use of animation in the graphical user interface. Automobiles, appliances, and other devices that use microcontrollers often include failure lights that blink in a particular pattern to indicate particular types of trouble. Including animation sequences for each of the potential failure modes would require a significant amount of data and programming, much of which will never be used (assuming that, in general, the appliance systems do not fail). In accordance with the present invention, complex presentation methods such as animation sequences can be requested by a user of the manual and provided on demand so that a part being viewed can be animated to show normal and/or malfunctioning operation.

Other features of the present invention involve the definition of default perspectives with the unit data structures. It has been found that one limitation of truly interactive three-dimensional graphical user interfaces is that a user may become disoriented or lost. This has not been a problem in prior systems that have static data presentation because the user could not manipulate the perspective and content presented in a view. In accordance with the present invention, upon initial selection of an object a default perspective or starting point is presented in one or all views of the graphical user interface. A user can then manipulate the object from the defined starting point, and may preferably return to the default perspective as desired.

FIG. 1 shows an exemplary networked computer environment in which the present invention is implemented including various computing devices such as personal computer 102, wireless hand-held device 103, and laptop 104 interconnected by a network 101. In one embodiment, an appliance such as washing machine 107 includes a network connection, and/or a connection to another computing device such as device 104. Appliance 107 could be any type of appliance, machine, or system which is the subject of a product/service manual in accordance with the present invention. In the particular example of FIG. 1, appliance 107 includes an integrated display device for use with a graphical user interface, however, this capability is optional.

It should be understood that the present invention does not require a network environment, nor network connectivity to appliances such as appliance 107. In fact, because the present invention can greatly ease the hardware requirements needed to provide a three-dimensional product manual, it enables stand-alone operation of devices such as hand-held device 103 and/or appliance 107 with relatively little computing power. However, for this same reason the present invention enables client-server computing systems in which computationally intensive graphical processes and/or database operations are conducted on a server 105. In such systems, end-user devices 101–104 and 107 may implement only a graphical user interface, or may implement any desired subset of the graphical processes used to render and manipulate graphical user interface objects.

Each of the devices shown in FIG. 1 may include memory, mass storage, and a degree of data processing capability sufficient to manage the display of information using a display device and manage a network connection where one is implemented. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as data store 106 that provides mass storage capacity beyond what an individual device can efficiently use and manage. Selected components of the present invention may be stored in or implemented in data store 106.

FIG. 2 illustrates an exemplary user interface presented in a windowed environment such as is familiar to many personal computer users. Non-windowed graphical user interface environments can readily be adapted to the present invention as well. The particular examples herein use a web browser as a graphical user interface to leverage software that is common across many computing platforms, however, any type of graphical user interface is readily substituted. A user is enabled to interact with the graphical user interface using a pointing device such as a mouse, pen, stylus, touch-screen monitor or tablet that enables a user to position a cursor 204 over a desired location anywhere in the graphical user interface and select an object at that location.

As shown in FIG. 2, the graphical user interface 200 preferably includes at least one window, pane, frame or portion 201 allocated to displaying a graphical (i.e., two- or three-dimensional representation) of a product that is the subject matter of the product/service manual in accordance with the present invention. An object is indicated by, for example, floating the cursor over a particular location. In a particular embodiment, the object identification information is obtained from the frame buffer and a tool tip 206 is displayed as shown in FIG. 2. In many cases the tool tip information may simply comprise a name for the component under the cursor, however, any amount of information may be included in the tool tip. As the cursor is moved from one location to another, as suggested by the dashed-line arrow in FIG. 1, the displayed tool tip changes to indicate the object identification of the object currently under the cursor.

In addition to the three-dimensional image view, the present invention preferably includes a hierarchical view 202 and an information view 203. Hierarchical view 202 communicates the hierarchical relationship of a currently selected object with respect to parent and child components. For example, the control panel is a component or child of the entire washing machine. The control knob is a child of the control panel. Preferably this hierarchical relationship is conveyed using positioning, colors, or other visual cues that suggest a hierarchical relationship. The hierarchical view 202 presents one or more branches of the component and sub-component relationships that exist in the real world system or device. The hierarchical view 202 aids the user in understanding a particular system being examined, and is a navigational expedient as components are explored.

Information view 203 includes a number of variable components that provide information relevant to a selected object. In the representation of FIG. 2, the entire washing machine is selected at a gross perspective, and the information view presents data or links to data about available documentation, features and the like. Functionality available at the gross level is also presented, as are actions that a user can perform on the selected object. Functionality refers to normal and/or abnormal functions that the machine or system will perform. Actions refer to things the user can do to manipulate or operate the selected object. As described more fully below, as sub-components of the system are selected, the set of available functions, actions, and documentation changes to be relevant to the user-indicated need.

In some applications, error conditions associated with a particular selected object are also displayed as shown in FIG. 1. Error conditions are conditions that are known to occur with respect to a selected object and are again specific to the particular object selected. At the gross level shown in FIG. 2, some very high-level error conditions may be presented such as lack of power to the machine, and the like.

Preferably, all of the information presented in a particular view such as shown in FIG. 2 is associated with a single unit data structure that contains any number of sub-unit data structures corresponding to particular sub-components of the real world system. The unit data structure corresponding to the entire washing machine is the highest-level data structure in the particular example. The highest-level unit data structure includes links or interfaces to a control panel unit data structure, a control knob data structure, a digital display data structure, a porthole data structure and the like. These sub-components are contained in the high level data structure in the sense that the high level data structure includes references to the lower level object.

For example, the sub-unit data structure corresponding to the control panel is presented in the three-dimensional image portion 201, the hierarchical portion 202, and the information portion 203. A user can select any of the presentation information corresponding to the control panel data structure with a similar result on the entire display. A user can also manipulate the perspective and zoom level on the image portion 201 without changing the selected data structure.

A user can select a sub-unit data structure by positioning the cursor over one of the representations of the sub-unit data structure in any of portions 201, 202 or 203. Some sub-unit data structures may be presented in only one of the portions 201–203, whereas other sub-unit data structures may be presented in a plurality of or all of the portions 201–203.

Because all of the information presented in the various views shown in FIG. 2 are inherently related because they are aggregated into a single unit data structure, they are highly coordinated and easy to program, maintain, and use. A design change to a new lint filter, for example, need only affect a lint filter data structure and the upper-level data structures will automatically incorporate the changes. Moreover a user will only be presented with the detailed information about a sub-component if and when that sub-component is selected. Hence, only information relevant to a particular user in a particular instance need be communicated to the user.

Figure 4:
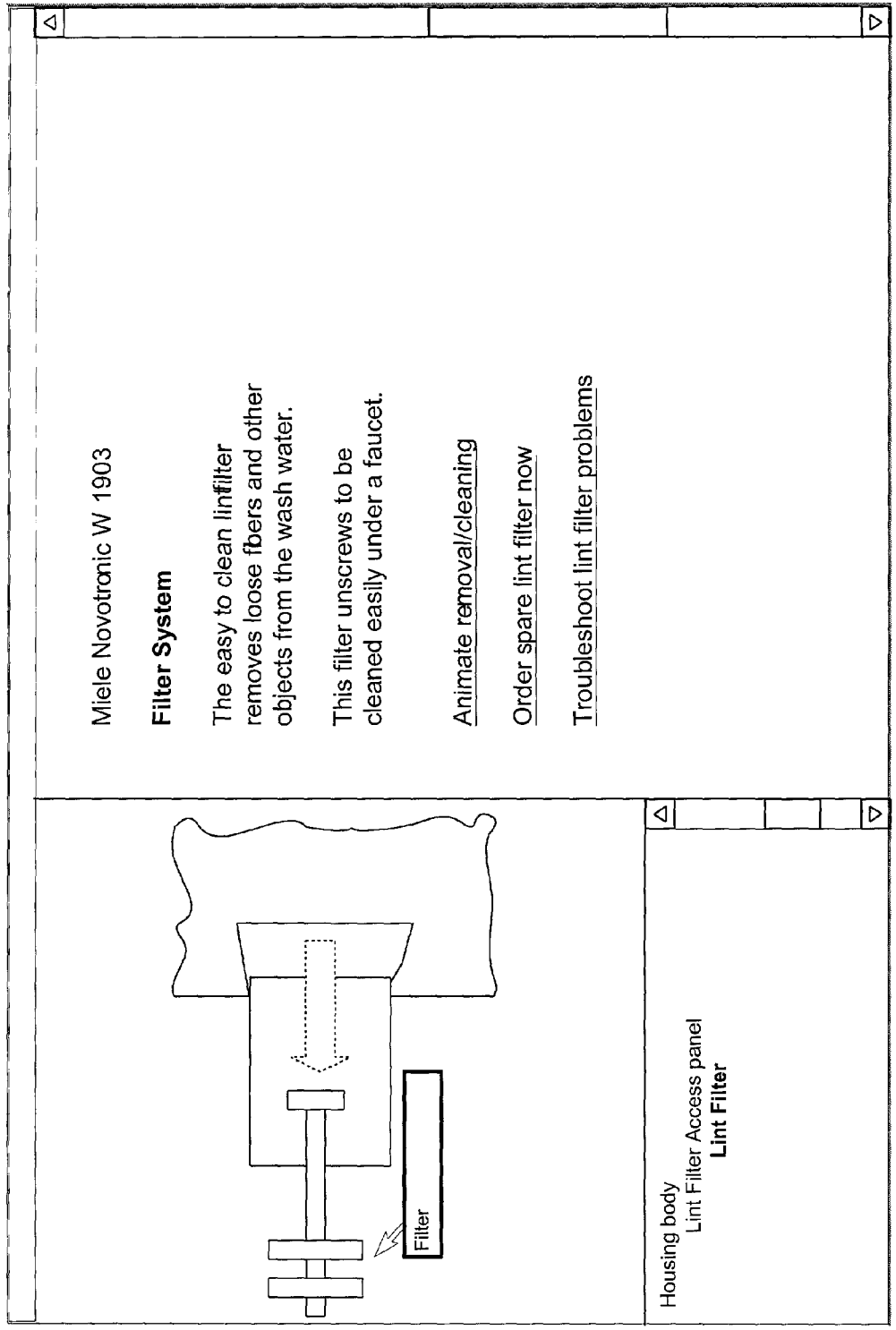
FIG. 4 illustrates a third representation of a user interface of an electronic manual in accordance with the present invention.

Although not capable of illustration, the present invention also contemplates that at least some unit data structures will include animation sequences that will illustrate certain actions and functionality. For example, selection of the "access lint filter" entry in the information window may launch an animation sequence describing how the porthole door is operated as shown in FIG. 4. Conveniently, the animation selects the "lint filter" data structure, displays the animation in image portion 201 and displays useful information such as filter ordering information and lint-filter specific troubleshooting information in the information window.

Figure 3:
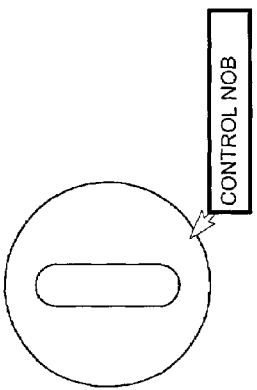
FIG. 3 illustrates a second representation of a user interface of an electronic manual in accordance with the present invention.

A user can select a particular data structure by pressing a mouse button, keyboard button, or similar indicating device. Selection of an data structure results in updating of all the frames as shown in FIG. 3 to present information corresponding to the selected data structure. For example, the three-dimensional image portion may zoom or reorient to a default perspective for the selected data structure while the hierarchical frame will focus on a branch corresponding to the selected data structure and the information frame will display documentation, functionality, actions, error conditions and/or order information specific to the selected component. As shown in FIG. 3, another useful display in the information portion is product order information that is tailored to the specific component corresponding to the particular data structure. Other information such as error conditions, functionality, and actions specific to the selected component can be displayed.

Any number of hierarchical levels can be incorporated in this manner. However, this level of flexibility sometimes results in a user becoming disoriented or lost in a particular spatial view or branch. One feature of the present invention is that each of the data structures includes default presentation information that includes default content, including default spatial perspective as well as default content in any other views when the object is initially selected. The default view constrains the user interface in a manner that discourages disorientation, but allows the user to continue to tunnel down into an data structure from the default content. This feature also promotes better cognition of a problem condition by a user by ensuring that the user is aware of interacting components and sub-components during an investigation.

Figure 5:
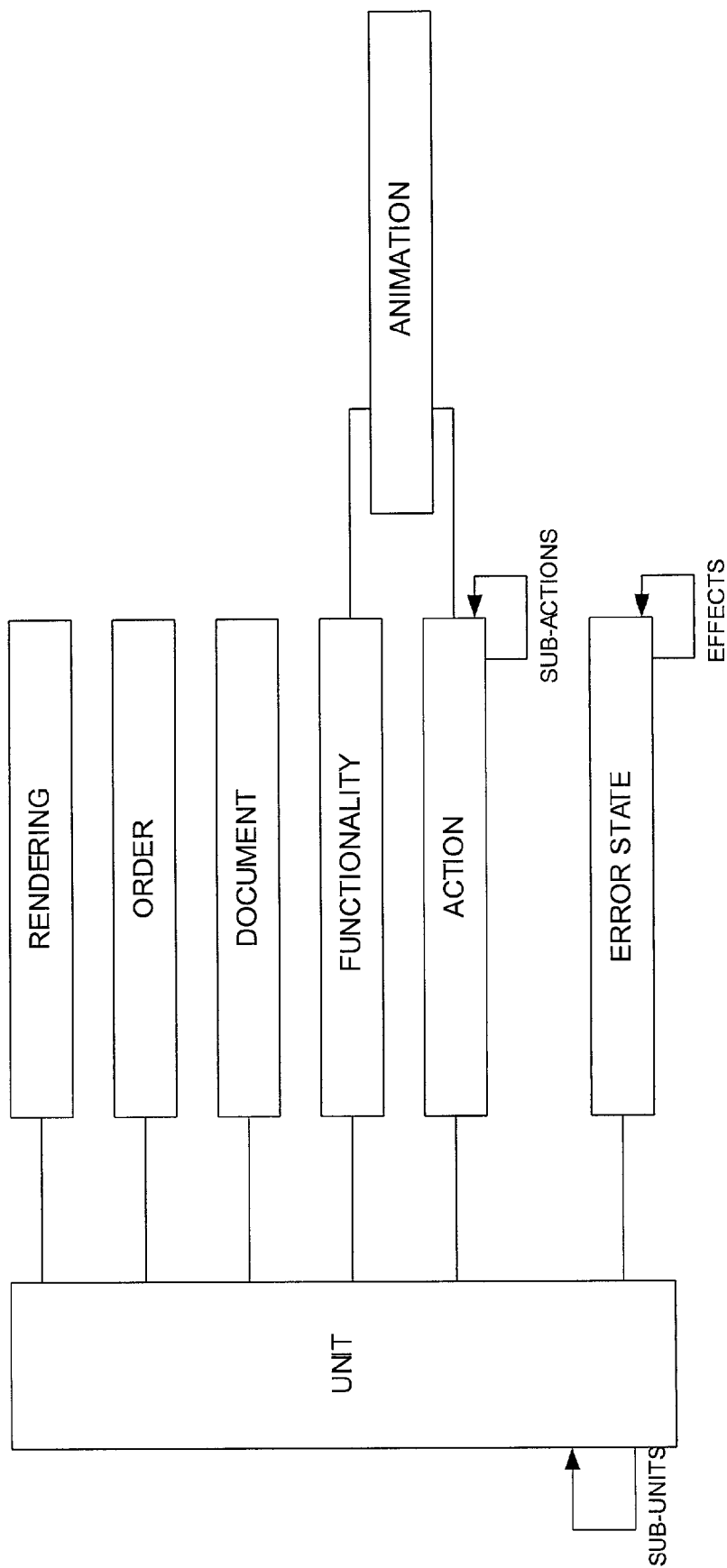
FIG. 5 shows components of a unit data structure used to implement the electronic manual in accordance with the present invention.

FIG. 5 illustrates an exemplary unit data structure used in the present invention. The unit data structure acts to aggregate or contain data of disparate types, and make available the disparate data to a user via a graphical user interface application. The data structure definition defines a variety of information types including CAD design files, 3D graphics files, marketing materials, product descriptions, etc.

Each unit data structure also has a predefined "default" presentation information in one or more of the views described above. In operation, when a unit data structure is first selected, the predefined default presentation information are displayed. This is most apparent in the graphical view in which the dfault presentation information includes a default perspective in which viewpoint, magnification, rotation, and the like may be predefined by default presentation information to guide the user to a selected part. Additionally, highlighting to indicate the selected part with any kind of pointers, colors, different shading, positioning, hiding non-selected surrounding parts, transparency, text, sound and the like may be included in the default presentation information to determine other features of the graphical information display that may be useful to a user's ready understanding of the information being presented.

Any default presentation information may be used that aid a user in understanding what is being viewed in relation to other system components, including text, graphics, sound, or other information that aides the user in this goal. This aids significantly in navigation as the user does not get lost in the graphical view(s) when selecting parts of a complex system. This also ensures that the user has a known perspective from which to begin understanding information in the other view frames. In total, this has an effect of making it much easier for the user to reach a cognitive understanding of what is being displayed, a great advantage for user manuals.

Unit data structure 500 provides linking between the various disparate data types so that when an object is selected via one of the data types, the presentation of the other data types can be updated automatically to continue the integrated presentation. This linking is often implicit as the different displayed views of the data structure are all referencing the same data model. Hence, a "starter motor" can be displayed graphically, textually, and as a part of a hierarchical listing of components, but each displayed view is referencing the same data model. Accordingly, when a user selects an armature winding, irrespective of whether the winding is selected via the graphical display, text display or hierarchical display, the same portion of the unit data model is referenced to provide data to the GUI application for implementing behavior in response to the selection event. In this manner, the electronic manual in accordance with the present invention is readily linked to external databases to provide current, user-centric information to a user without the large overhead normally associated with having that extent of information present on the user's machine.

In the particular example, a "unit data structure" (shown in greater detail in FIG. 5) is defined that can be used both to contain other data structures and to include object-specific information. The unit data structure implements a data model used to store all information provided by a manual application. The application provides a graphical user interface (GUI) for displaying one or more views of the unit data structure, and so provides differing perspectives of the underlying data model.

The GUI application is preferably implemented independently of the data model implemented by the unit data structure. In other words, methods for creating displays are not within the unit data structure itself, but instead are implemented in the GUI application. Keeping the GUI behavior out of the data model enables the application to provide several views to the same underlying data.

This feature enables "role-based" data access. By role-based data access it is meant that the manner in which data is displayed can be varied based on the role of the user, without changing the underlying data model. For example, the service technician has access to maintenance and diagnosis views whereas terminals offer only logistic data like availability and storage location of spare parts. In this manner, a single comprehensive data structure, the unit data structure, can be shared and leveraged across multiple roles.

Each unit data structure includes a quantity of object-specific data such as a definition of the default perspective of that particular unit object, as well as data indicating the hierarchical relationship of the specific unit data structure to other data structures (e.g., external databases, sub-unit data structures, and the like). The hierarchical information can be used to identify the contained sub-unit data structures for use in GUI application processes that access external databases and/or access sub-unit data structures. Some of the interfaces shown in FIG. 5 may be null for a particular unit data structure. For example, there may be no user-initiated actions that can be taken on a particular product component, and so the particular unit data structure representing that product or component will not have data related to Actions.

As illustrated in FIG. 5, animation sequence(s) data may be included in the unit data structure and linked to particular functionality or actions that can be performed with or on the component corresponding to the unit data structure. A user may select a particular machine function and the GUI application will obtain the animation data an play an animation intended to illustrate proper and/or malfunctioning behavior for the component. Similarly, an animation may illustrate an action to be performed such as tightening a screw or replacing a belt. The animation sequences can be used interactively with the error state data such that for a particular error state, specific actions are prescribed and animations presented, as implemented by the GUI application. Once the prescribed actions are performed by the user, the error state can once again be reviewed to determine if an error condition has been resolved. In this manner, the present invention enables interactive, situation-specific troubleshooting.

FIG. 6 illustrates a highly simplified unit data structure implementation in accordance with the present invention including image rendering information, ordering information, and documentation information. As shown in FIG. 6, the unit data structure in accordance with the present invention is readily implemented in a markup-language document such as an XML document or the like. It is contemplated that almost any data structure including one or more tables in a flat or relational database, or other available data structure could implement a unit data structure. This allows the unit data structure to be highly portable in that it can be displayed on a wide variety of devices and graphical user interface programs.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the present invention may enable an interactive product/service manual to be embedded into a system or appliance. Embedded systems are necessarily very simple and constrained in the type and quantity of information that can be presented to a user. A manual that requires significant computational resources to run would increase the cost and complexity of the appliance. Because the present invention can be provided in a relatively compact form, all or part of the present invention may be embedded in an appliance itself. Because data and program code needed at runtime can be dynamically accessed, the system in accordance with the present invention can be effectively run on a moderately complex microprocessor. These and other extensions, equivalents, and applications of the present invention are encompassed by the following claims.

We claim:

1. An electronic product manual stored in a computer readable medium comprising:
    a plurality of data structures, each data structure holding data representing a product and having a hierarchical relationship as components and sub-components with each other;
    a graphical user interface (GUI) configured to present data selected from the plurality of data structures to a user in the form of displayed objects, receive input from the user, and enable a user to select data from the plurality of data structures by selecting a displayed object;
    a first view of the selected data structure displayed in the GUI upon selection, the first view comprising an image of the selected object;
    a second view of the selected data structure displayed in the GUI upon selection, the second view including information indicating a hierarchical relationship of the selected data structure with respect to other data structures; and
    a third view of the selected data structure displayed in the GUI upon selection, the third view including component-specific information.

2. The product manual of claim 1 wherein the first, second and third views of the selected data structure are displayed simultaneously.

3. The product manual of claim 1, wherein the graphical user interface is configured to enable selection of any displayed object from any of the first, second and third views.

4. The product manual of claim 1 wherein the first view comprises a three-dimensional image of the selected object having user-selectable sub-components.

5. The product manual of claim 1 wherein the first view further comprises help information obtained from the selected data structure associated with a particular displayed object and made visible in the first view when user input indicates a focus on the particular displayed object.

6. The product manual of claim 1 wherein the second view comprises a tree structure depicting the hierarchical relationship.

7. The product manual of claim 1 wherein the third view presents ordering information relevant to the selected object.

8. The product manual of claim 1 wherein each of the plurality of data structures includes data types relevant to the first, second and third views.

9. The product manual of claim 1 wherein at least one of the plurality of data structures includes a pointer to an external data store having current information.

10. The product manual of claim 1 further comprising:
    a selection tool operable to receive user input and indicate a user-selected object from the plurality of displayed objects in one of the first, second, and third views;
    wherein the GUI is configured to allow updating of the first, second, and third views in response to the user's selection of an object.

11. The product manual of claim 10 wherein each of the plurality of data structures defines a default perspective and the act of updating the first, second and third views comprises presenting the default perspectives.

12. A display object for product manual having a graphical user interface, the display object corresponding to a real-world component of a system, the display object comprising:
    a link to a unit data structure;
    first presentation means initiated in response to selection of the displayed object and operable to retrieve an image of the display object from the unit data structure and display the image using the graphical user interface;
    second presentation means initiated in response to selection of the displayed object and operable to retrieve a hierarchical view from the unit data structure and display the hierarchical view using the graphical user interface; and
    third presentation means initiated in response to selection of the displayed object and operable to retrieve a information about the real-world component from the unit data structure and display the information using the graphical user interface.

13. The display object of claim 12 further comprising:
    selection means operable to retrieve selected data from the unit data structure in response to user input indicated selection of the displayed object.

14. The display object of claim 12 further comprising ordering means implementing a product ordering interface for ordering the real-world component.

15. The display object of claim 12 further comprising documentation means for obtaining a pointer to a documentation database from the unit data structure and accessing the documentation database containing documentation associated with the real-world component.

16. The display object of claim 12 further comprising functionality means for accessing a description of functionality of the real-world component from the unit data structure.

17. The display object of claim 12 further comprising actions means for accessing a description of actions that are possible to perform on the real-world component from the unit data structure.

18. The display object of claim 12 further comprising error state means for accessing a description of potential error states for the real-world object from the unit data structure.

19. The display object of claim 12 further comprising:
    animation methods coupled to communicate with the actions means for retrieving animation sequence data from the unit data structure and generating an animation depicting the actions on the graphical user interface.

20. The display object of claim 12 further comprising:
    animation means coupled to communicate with the functionality methods for retrieving functionality data from the unit data structure and generating an animation depicting the functionality on the graphical user interface.

21. The display object of claim 12 further comprising data structures within the unit data structure for indicating relationships between the display object and other, external display objects, wherein the relationships mirror relationships between real-world components.

22. The display object of claim 12 wherein the unit data structure includes a definition of a default perspective for the display object in each of the first, second, and third presentation methods.

23. A method for displaying a product manual for a particular product, the product comprising a plurality of components and sub-components, in an interactive graphical user interface, the method comprising the acts of:
   gathering resources related to the product and its components and sub-components, the information including information of types selected from the group consisting essentially of documentation, ordering information, graphical display information, functionality, actions, error states and animation;
   organizing the information into sets of information related to particular components and sub-components within the particular product;
   defining a unit object data structure to hold data related to a particular component irrespective of the data type; and
   using data from the unit data structure of an initial component to generate a graphical user interface corresponding to the unit data structure and presenting user-selectable links to sub-component unit data structures.

24. The method of claim 23 further comprising the act of using the first instance to instantiate subsequent instances of the unit object class for selected sub-components.

* * * * *